S. H. KENNEDY.
VEHICLE STEERING MECHANISM.
APPLICATION FILED JAN. 6, 1912.
1,047,238.
Patented Dec. 17, 1912.
2 SHEETS—SHEET 1.
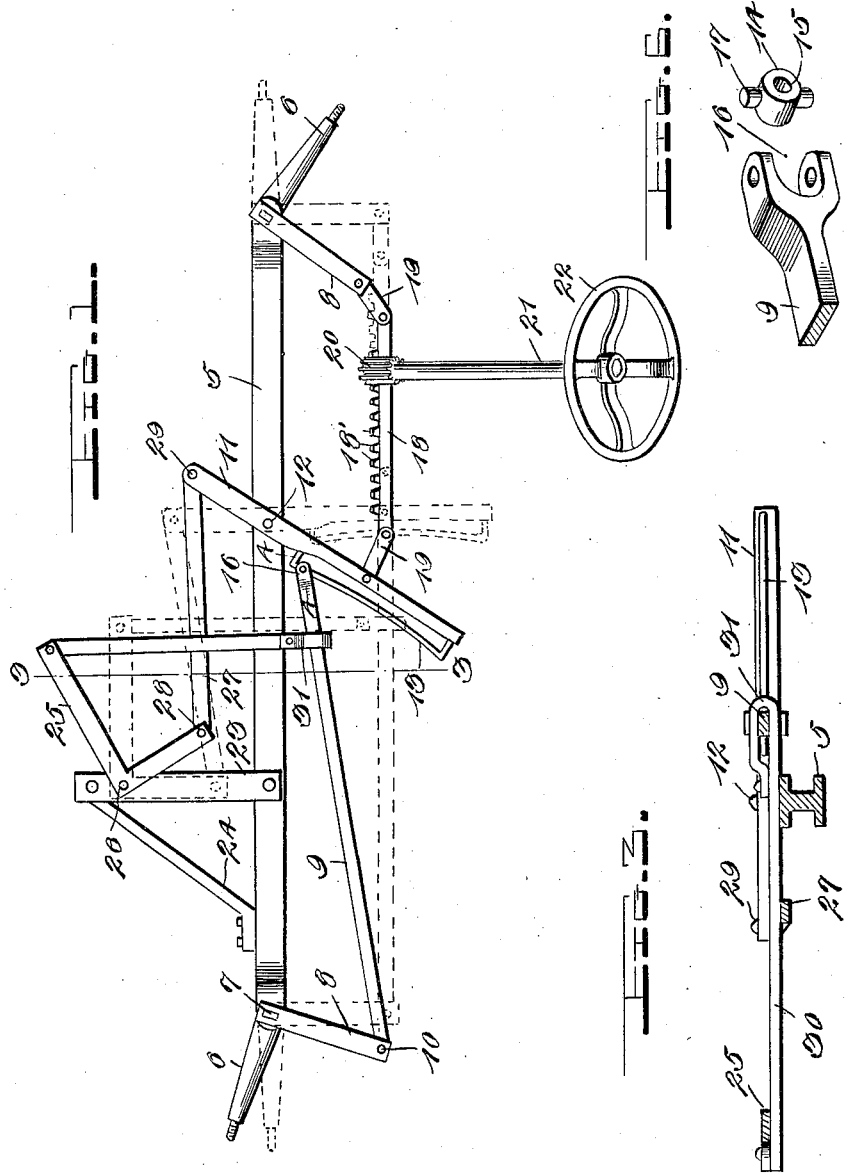
Inventor
S. H. Kennedy,
Witnesses
Chas. L. Griesbauer.
G. B. Norton.
By Watson E. Coleman
Attorney

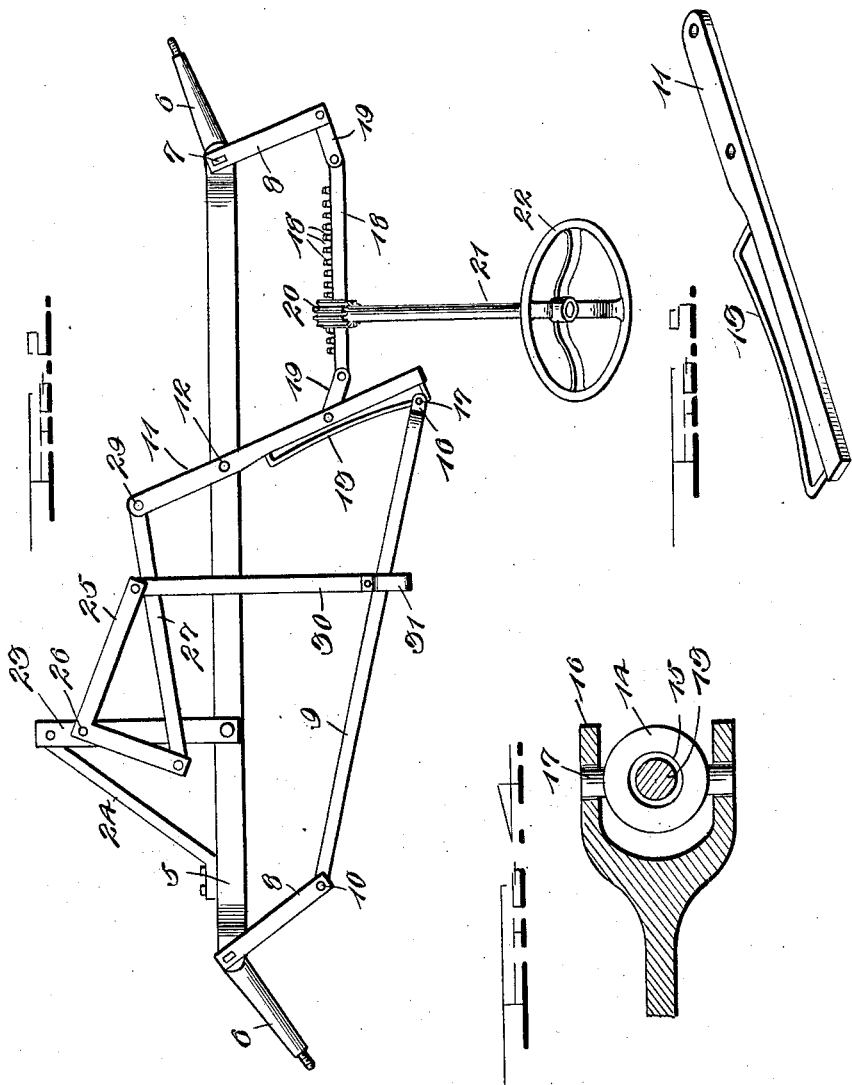

UNITED STATES PATENT OFFICE.

SAMUEL H. KENNEDY, OF TUNNEL HILL, GEORGIA.

VEHICLE STEERING MECHANISM.

1,047,238. Specification of Letters Patent. Patented Dec. 17, 1912.

Application filed January 6, 1912. Serial No. 669,771.

*To all whom it may concern:*

Be it known that I, SAMUEL H. KENNEDY, a citizen of the United States, residing at Tunnel Hill, in the county of Whitfield and State of Georgia, have invented certain new and useful Improvements in Vehicle Steering Mechanism, of which the following is a specification, reference being had to the accompanying drawings.

This invention relates to vehicle steering mechanism and has for its primary object the provision of a simple, efficient and durable device of this character whereby the vehicle may be easily and quickly turned in a small arc without danger of upsetting the vehicle.

Another object of the invention resides in the provision of a differential steering mechanism which consists of comparatively few elements of simple form which are so arranged and associated as to effect the positive angular disposition of the wheels of the machine and cause a greater movement of one of said wheels than the other in making short turns.

Still another object of the invention is to provide a device for effecting the differential movement of the vehicle wheels, which is of extremely simple construction, whereby liability of derangement of the parts is practically eliminated.

With the above and other objects in view, the invention consists of the novel features of construction, combination and arrangement of parts hereinafter fully described and claimed, and illustrated in the accompanying drawings, in which—

Figure 1 is a top plan view of my improved steering mechanism showing the same mounted upon the vehicle axle and illustrating the relative position of the parts thereof when making a right hand turn; Fig. 2 is a similar view showing the arrangement of the parts for steering the vehicle to the left; Fig. 3 is a section taken on the line 3—3 of Fig. 1; Fig. 4 is a detail section taken on the line 4—4 of Fig. 1; Fig. 5 is a detail perspective view of one of the actuating elements. Fig. 6 is a detail perspective view illustrating the connection of the actuating element to the connecting bar between the same and one of the wheel spindles.

Referring in detail to the drawings 5 designates the vehicle axle upon the ends of which the wheel spindles 6 are pivotally mounted for movement in a horizontal plane. Upon the inner ends of these spindles the vertical rectangular studs 7 are formed upon which the arms 8 are engaged. These steering arms extend inwardly of the axle 5 and to one of them a bar 9 is pivotally connected as at 10. An actuating bar 11 is pivotally mounted intermediate of its ends as designated at 12 upon the axle 5 and extends forwardly and rearwardly of said axle. To the rearwardly extending portion of this bar a longitudinally disposed arcuate rod 13 is secured at its ends, the intermediate portion of said rod being spaced from the bar as shown. A knuckle member 14 is provided with an opening 15 to loosely receive the rod 13 upon which said member is disposed for longitudinal movement. This knuckle member is disposed in the bifurcated end 16 of the bar 9 and is provided with pivot studs 17 to be received loosely in openings formed in the spaced arms of said bar.

A rack bar 18 is arranged between the other of the arms 8 and the actuating bar 11 and is connected to said arm and bar by means of the links 19. With the teeth 18' on the rack bar 18, the teeth of a pinion 20 on the lower end of the steering shaft 21 engage. This steering shaft is disposed through the floor of the vehicle body in the usual manner and has a hand wheel 22 fixed upon its upper end.

To the axle 5 a forwardly extending bar 23 is rigidly fixed and is braced by means of the inclined bar 24. Upon the bar 23 a bell crank lever 25 is pivoted as indicated at 26 and to one end of this bar the end of a connecting bar 27 is pivoted as shown at 28. The other end of this connecting bar is pivotally connected to the forward end of the actuating element 11 as at 29. To the other arm of the bell crank lever one end of a longitudinally disposed bar 30 is pivoted, the other end of said bar being provided with a loop 31 through which the bar 9 is disposed.

In Fig. 1 of the drawings, the parts are shown in their normal positions and when it is desired to make a turn to the right, the hand wheel 22 on the upper end of the steering shaft 21 is turned to the right, thereby moving the rack bar 18 to the left and thus moving the bell crank lever 25 through the medium of the bars 11 and 27 to swing the transversely disposed arm thereof forwardly of the pivot 26 of said lever. This movement of the bell crank lever pulls the inner end of the bar 9 forwardly through the medium of the connecting bar 30 and moves the knuckle member 14 upon the arcuate rod 13 to the forward end thereof. It will consequently be seen that in the movement of the rack bar 18, the right hand wheel of the machine is disposed at a greater angle than the outer or left hand wheel. This position of the parts is shown in full lines in Fig. 1. It will be readily seen that by providing the link connections 19 between the rack bar and arm 8 and actuating bar 11 said rack bar will maintain its proper position in a plane transverse of the machine so that the teeth thereof are in constant engagement with the teeth of the pinion 20. When the turn is made to the left, a left hand movement of the steering wheel 22 moves the rack bar 18 to the right and the inner end of the bar 9 is moved rearwardly upon the rod 13, thereby causing the left hand wheel to assume a much greater angle with relation to the longitudinal axis of the machine than the right hand wheel. The position of the parts in making a left hand turn is illustrated in Fig. 2.

From the foregoing it is thought that the construction and operation of my improved steering mechanism will be fully understood.

The device consists of comparatively few elements which are of simple form and are not therefore liable to get out of order, thus rendering the entire mechanism extremely durable. By means of this arrangement of parts a very short turn may be made without danger of upsetting the machine. The parts act very freely and positively and admit of the turn of the machine around a corner very quickly and with a minimum expenditure of energy upon the part of the operator. Owing to the simple form of the parts and their accessibility, such repairs as may be necessary may be made at an insignificant expense. The entire mechanism may also be manufactured at comparatively small cost.

While I have shown and described the preferred construction and arrangement of the various parts, it will be understood that the mechanism is susceptible of a great many minor modifications in the form, proportion and arrangement thereof without departing from the essential feature or sacrificing any of the advantages of the invention.

Having thus described the invention what is claimed is:—

1. The combination with a vehicle axle and wheel carrying spindles mounted thereon, of steering mechanism comprising an actuating element pivotally mounted upon the wheel axle, a rack bar connecting one of the wheel spindles to said actuating element, a steering shaft provided with a pinion to mesh with the teeth of the rack bar, a bar connected to the other of the wheel spindles and movably connected to said actuating element, and means actuated by said element for moving the latter bar to effect a differential steering movement of the vehicle wheels.

2. The combination with a vehicle axle and wheel carrying spindles mounted thereon, of an actuating element pivotally mounted upon the axle, a rack bar connecting said element to one of the spindles, a second bar connected at one end to the other of the spindles, means connecting the other end of said bar to said actuating element whereby the end of the bar may be moved in an arcuate plane with relation to said element, a steering shaft provided with a pinion to mesh with the teeth of the rack bar to actuate the same, and means mounted upon the vehicle axle and connected to said actuating element to move the bar connected thereto and effect a differential steering movement of the vehicle wheels.

3. The combination with a vehicle axle and wheel carrying spindles mounted upon the ends thereof provided with rearwardly extending arms, of an actuating element pivotally mounted upon the axle and extending forwardly and rearwardly thereof, a rack bar, link connections between the ends of said rack bar and one of the arms and said actuating element, a steering shaft provided with a pinion to mesh with the teeth of the rack bar, an arcuate rod arranged upon the rearwardly extending portion of said actuating element, a bar pivoted at one end to the other of the steering arms, the other end of said arm being longitudinally movable upon said arcuate rod, and means mounted upon the axle and connected to said element and to said bar to move the bar with respect to the actuating element and effect a differential steering movement of the vehicle wheels.

4. The combination with a vehicle axle provided with wheel carrying spindles and steering arms extending rearwardly therefrom, of an actuating element pivotally mounted upon the axle and extending forwardly and rearwardly thereof, a rack bar connecting one of the arms to said element, a steering shaft provided with a pinion to mesh with the teeth of said rack bar, a longitudinally disposed arcuate rod secured to the rearwardly extending portion of said actuating element and spaced therefrom, a bar pivotally connected at one end to the other of the arms, a knuckle member loosely mounted in the other end of said rod and movable upon said rod, a bell crank lever supported upon the axle, a bar pivotally connecting one of the arms of said lever to the forward end of said actuating element, and a second bar connecting the other arm of the bell crank lever to the last mentioned bar which is connected to the steering arm to move said bar independently of the actuating element and effect a differential steering movement of the vehicle wheels.

5. The combination with a vehicle axle provided at its ends with wheel carrying spindles, an actuating element pivotally mounted upon the axle and extending forwardly and rearwardly thereof, a bell crank lever, a connection between one of the arms of said lever and the forward end of the actuating element, means connecting the other end of said lever with the actuating element and one of the wheel spindles, and operating means connecting the other of the wheel spindles to said actuating element, said connections between the bell crank lever, the actuating element and the first referred to wheel effecting a differential steering movement of the wheels.

In testimony whereof I hereunto affix my signature in the presence of two witnesses.

SAMUEL H. KENNEDY.

Witnesses:
  C. L. EASLEY,
  A. T. CLARK.

---

Copies of this patent may be obtained for five cents each, by addressing the "Commissioner of Patents, Washington, D. C."